United States Patent [19]

Jehle

[11] 3,748,148

[45] July 24, 1973

[54] METHOD OF PRODUCING SAUSAGE SUITABLE FOR DIETARY PURPOSES

[76] Inventor: Heinrich Jehle, Karlstrasse 41, Friedrichshafen, (Bodensee), Germany

[22] Filed: Mar. 10, 1972

[21] Appl. No.: 234,441

Related U.S. Application Data

[63] Continuation of Ser. No. 58,998, July 28, 1970, abandoned, which is a continuation-in-part of Ser. No. 635,651, May 3, 1967, abandoned, which is a continuation-in-part of Ser. No. 94,600, Dec. 2, 1970, abandoned, which is a continuation-in-part of Ser. No. 523,049, Jan. 26, 1966, abandoned.

[30] Foreign Application Priority Data

| Feb. 2, 1965 | Germany | J 27 43 653 |
| Sept. 22, 1965 | Germany | J 29 03 853 |
| Sept. 22, 1965 | Germany | J 14 25 553 |

[52] U.S. Cl. .................................................. 99/109
[51] Int. Cl. ........................................... A22c 11/00
[58] Field of Search ....................... 99/107, 108, 109

[56] References Cited
OTHER PUBLICATIONS

Ward, "The Encyclopedia of Food," 1923, published by Artemus Ward, N.Y., Article Entitled Liver Sausage, pg. 463.

Dobbin, "The Low Fat, Low Cholesterol Diet" 1951, Published by Doubleday & Co., N.Y., Pg. 323, Article Entitled Nuts.

Roberson, "The Meat Cookbook" 1953, published by Henry Holt & Co., N.Y., pg. 149, Article Entitled Brazil-Nut Meat Loaf.

Green et al., "J.A.M.A." Vol. 183, No. 1, Jan. 5, 1963, Pg. 91–98, incl., Article Entitled Use of Fat-Modified Foods for Serum Cholesterol Reduction.

*Primary Examiner*—Hyman Lord
*Attorney*—Ernest G. Montague

[57] ABSTRACT

A meat mass for sausages, as well as a method of producing the same, which is particularly suitable for dietary purposes comprising lean meat from which substantially all visible fat has been mechanically removed, which method comprises the steps of admixing at least one type of broken-up substantially mechanically fat-freed pork, beef or poultry meat with snow, water or spice additions, admixing granules of Brazil nuts to the meat as a substitute for the removed fat, filling the mixture selectively into intestines, preserve cans and casseroles, and subjecting the mass to smoking, scalding and baking respectively.

3 Claims, No Drawings

METHOD OF PRODUCING SAUSAGE SUITABLE FOR DIETARY PURPOSES

The present application is a continuation of the copending patent application, Ser. No. 58,998 filed on July 28, 1970 abandoned, which in turn is a continuation-in-part application of the patent application, Ser. No. 635,651, filed on May 3, 1967 (now abandoned), as well as a continuation-in-part application of the copending application, Ser. No. 94,600, filed Dec. 2, 1970, abandoned, which in turn is a continuation-in-part application of the patent application, Ser. No. 523,049, filed on Jan. 26, 1966 (now abandoned).

In a conventional sausage mass which can be used as to its appearance, taste and durability containing a comparatively large proportion of fat, usually more or less 50 percent and more, is often used. The best known salami brands (Mailaender salami or Hungarian salami) have at least 30 percent animal fats, while inferior qualities have 40 percent to 50 percent of fat.

It has been proposed before the present invention to produce a meat sausage for dietary purposes, which keeps well, e.g., such as salami and cervelatwurst. The avoiding of animal fat is necessary to obtain such result. For the avoiding of obesity, it is known to use a fat-poor mass by which the otherwise conventional fat quantities are substituted by paraffin. It has been also proposed to use fat-modified foods for serum cholesterol reduction. The altered foods were low in saturated fat and in some, the "hard" fats were replaced with polysaturated oils.

The present invention relates to a method of producing a substantially fat reduced mass for scalded sausages, which is particularly suitable for dietary purposes.

In accordance with recent observations, the deposits of fatty acid salts and cholesterol into the walls of the blood vessels is considered the essential cause for the so-called arterial calcification. A portion of the vessel walls is destroyed thereby. On the roughened and hardened inner walls, the blood can coagulate and can form thrombosis, which closes up the vessel and can cause infarct. Greater cholesterol quantities raise the coagulation readiness of the blood and increase the danger of the infarctation. The damaging cholesterol in this connection is found only in foods of animal origin, first of all in animal fats, not, however, in fats of vegetable origin, in particular non-saturated fatty acids. It has additionally been found that the cholesterol-level in the blood can be reduced by the feeding of multiple unsaturated fatty acids.

It is, therefore, one object of the present invention to provide a meat mass suitable for scalded sausages, which meat mass is fat-reduced without change as to its taste, and, thus, is particularly suitable for dietary purposes.

It is another object of the present invention to provide a meat mass suitable for scalded sausages wherein, instead of the conventional fat additions, there is made an addition of small cut pieces of Brazil nuts, as a substitute for the meat additions, which are admixed to broken up raw beef or meat with the admixture of snow, water and the conventional seasoning, and which is smoked and scalded or baked in intestines, preserve cans or casseroles.

This produces a raw sausage which is substantially completely free of visible animal fat and nevertheless a sausage remaining unchanged in taste, i.e., indistinguishable in taste and appearance from the conventional sausage which has moreover the advantage that it cannot become rancid.

The conventional seasoning additions can be substituted entirely or partly by dried figs, raisins, currants and sultanas.

The mass having been stirred or mixed, is filled into intestines and preserve cans and smoked and scalded in conventional manner; it can also according to type of meat be baked in casseroles.

The scalded sausages, in accordance with the present invention, have the advantage that as to their taste they coincide with the known varieties but prevent circulation damages and fat accumulation.

The present invention pertains also to a method of producing a fat-reduced mass for sausage, particularly for dietary purposes made of lean meat, freed of all visible fat parts, in which the conventional fat is substituted by Brazil nuts reduced in size to granules.

According to the present invention it is now shown that it is possible to produce a fat-reducted scalded sausage, which is distinguishable from the previous conventional scalded sausage, and is outstandingly suitable for dietary purposes.

Thus, in accordance with the present invention, for the production of scalded sausages, instead of the conventional fat addition, there is used about 20-35 percent of granules of Brazil nuts and for the remaining mass, cut-up size reduced raw poultry meat, pork, or beef which has been freed of visible fat with an admixture of snow, water and conventional seasoning.

In accordance with the present invention the Brazil nut granules are added, not to provide a correction in the taste or the like, but rather as a substitute for the conventional fat addition. In accordance with the present invention a corresponding addition is made of non-animal fat and granules of Brazil nuts corresponding to the heretofore previous fat addition. The remainder of the sausage mass is raw poultry meat, pork or beef, from which the visible fat has been mechanically removed, or mixtures of said meat.

Since one deals, in the case of cholesterol, with fat addition (lipoid), which is found exclusively in animal fat, the removal of this fat addition necessarily reduces cholesterol content. A sausage produced in accordance with the teaching of the present invention comprising one-third port, one-third beef, both freed of visible fat, and one-third Brazil nut granules shows only a median cholesterol content of 0.024 percent that is 100 g. sausage contained 24 mg cholesterol.

However, the use of Pistachio nuts, which are green kernels under a reddish or violet skin, and which have an almond-like taste, is not advisable in the production of raw sausage. The tough skin which surrounds the pistachio nut and which has to be removed before use, necessitates a longer process of scalding, during which process the nut becomes very soft and would expose the end porduct to an interior process of decay. Therefore, the use of Pistachio nuts as a taste carrier of the salami cannot be favored. In a few brands of scalded sausage products (i.e., Mortadella), Pistachio nuts are being used in small quantities, partly as spice additive and taste-builders, and partly as color contrast builders. Therefore the substitution of Pistachio nuts to be mechanically removed fat visible from the meat such in preparing dietary sausage products would not be suitable because of their particular spicy taste, substantially higher amount of carbohydrates and green color.

To the contrary, the addition of Brazil nuts, in accordance with the present invention, serves not for a taste modification or correction (i.e., not as a spice), but rather makes possible the production of a substantially cholesterol-reduced mass, in which, without changing the taste, the otherwise heretofore indispensable fat quantities in a raw sausage can be eliminated. The Brazil nuts being white kernels under a brown stonepeel, with a neutral taste, somewhat like the taste of walnuts but not as strong, and because of their higher vegetable fat content, and smaller content of carbohydrates, and their neutral color are very suitable as a substitute for the animal fat in raw sausage and to provide a highly desirable and unique dietetic sausage mass.

In accordance with the present invention, Brazil nuts which are substituted for the conventional fat additives, provide a sausage substantially reduced of cholesterol content, and yet one which cannot be distinguished in taste from a sausage prepared in the conventional manner with fat.

It was not expected that the addition of Brazil nuts in accordance with the present invention would provide, as a substitute for fat quantities, a sausage having the same indistinguishable taste.

The Brazil nuts, in accordance with the present invention, due to their unique characteristics, do not function as a flavoring, or spice, or seasoning, to the contrary of the heretofore used nuts in sausages, but as a fat substitute, and do not change the taste of the sausage.

The following are examples of the compositions of raw sausage masses produced in accordance with the present invention

EXAMPLE 1

(American Salami)
33⅓ % beef substantially free of visible fat;
33⅓ % pork substantially free of visible fat; and
33 ⅓ % Brazil nuts (granules of Brazil nuts approximately 1 mm)

EXAMPLE 2

(French Salami)
66 ⅔ % pork meat substantially free of visible fat; and
33 ⅓ % Brazil nuts (granules of Brazil nuts approximately of 2 mm)

EXAMPLE 3

(Russian Salami)
66 ⅔ % beef substantially free of visible fat; and 33 ⅓ % Brazil nuts (granules of Brazil nuts approximately of 3 mm).

EXAMPLE 4

65 % chicken meat free of visible fat,
20 % Brazil nut granules, with
15 % water, worked to one mass.

EXAMPLE 5

40 % turkey meat free of visible fat, and
40 % young visible fat free chicken meat, and
20 % Brazil nut granules.

EXAMPLE 6

80 % turkey meat free of visible fat, and
20 % Brazil nut granules

EXAMPLE 7

80 % chicken meat free of visible fat, and
20 % Brazil nut granules.

The sausage mass comprises merely the meat types of pork, beef or poultry meat illustrated in the above examples 1 through 7 and the Brazil nut granules to be added in accordance with the present invention, while the Brazil nut granules replace the previously mechanically removed animal fat substances.

The sausage mass free of substantialy all visible animal fat, contains practically no, or small amounts of animal fat.

In order to further improve the taste of the mass, foods as figs, raisins, currants or sultana raisins can be added to the mixture.

While I have disclosed several examples of the present invention, it is to be understood, that these examples are given by example only and not in a limiting sense.

I claim:

1. A method of producing meat mass for sausage particularly suitable for dietary purposes comprising the steps of admixing at least one type of broken-up meat, sausage mass from which substantially all visible fat has been mechanically removed with granules of Brazil nuts, said Brazil nut granules in said mixture being present in an amount of about 20 percent to 35 percent of said mixture, and said Brazil nuts being used as a substitute for said mechanically removed fat.

2. The method, as set forth in claim 1, further comprising the step of
adding spices to the said admixture.

3. The method, as set forth in claim 1, further comprising the step of
adding to the mixture foods selected from the group consisting of figs, raisins, currants and sultana raisins.

* * * * *